UNITED STATES PATENT OFFICE.

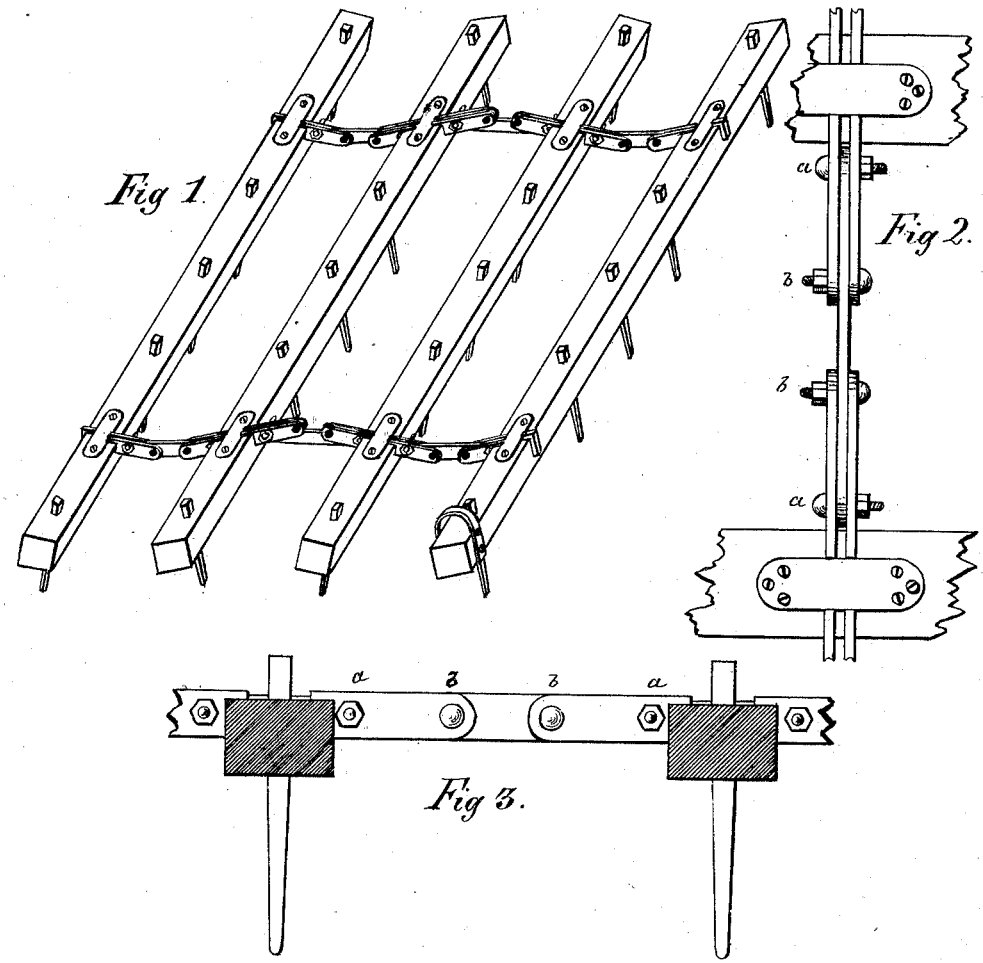

CHARLES BRODRICK, OF CHAMPAIGN COUNTY, ILLINOIS.

IMPROVEMENT IN HARROWS.

Specification forming part of Letters Patent No. 164,713, dated June 22, 1875; application filed March 12, 1875.

*To all whom it may concern:*

Be it known that I, CHARLES BRODRICK, of Champaign county, Illinois, have invented an Improvement in Drags or Harrows, used for leveling or pulverizing the earth in process of cultivation, of which the following is a specification:

My invention consists in the construction and application of a certain iron or metal coupling used in joining or coupling together the several wooden members or frame-work of the harrow, in which are inserted the teeth. The improvement thus obtained by the use of the said coupling consists in the manner of adjusting the said coupling so as to give the teeth of the harrow any desired angle. This coupling also gives the teeth of the harrow a free and untrammeled motion, so that when the coupling is only attached by one (the inner) bolt it can play back and forth from the angles above designated, and thus allow the teeth of the harrow to assume a horizontal position in passing over any obstruction. The backward motion or angle of the teeth will also allow all débris, such as weeds, grass, &c., to pass under the harrow, and not clog or obstruct the action of the teeth on the earth, and will thus cause a great saving of time and labor consumed in cleaning and raising the ordinary harrow now in common use over obstructions or passing around them.

When the nature of the ground will permit, and it is desired, the teeth may be made to assume and retain a vertical position by means of a second bolt through the coupling and metal piece attached to the frame-work of the harrow.

Figure 1 represents the harrow as coupled together ready for use, the angle of the teeth, however, being shown different from the angle assumed when in use, in order the better to illustrate the coupling. When thus coupled, as shown in Fig. 1, all the teeth will assume about the angle shown in the first and third members of the harrow from the left of the drawing, and when thus coupled and drawn forward the teeth will assume and retain a uniform angle, and after passing over obstructions will at once return to that angle. The motive power can be applied to either of the corners of the harrow, and the same result obtained, as the harrow will adjust itself to the proper angle when drawn in any direction from the several corners, and by passing the bolts or pins *a b* through both holes in each connecting-link, and securing the same, the several parts of such connecting-links will become rigid, and will be held in a uniform horizontal position, thus constructing a flexible into a rigid harrow by means of said connecting-links, when desired.

Fig. 2 represents a section of the coupling extending from one wooden member of the harrow to another. The drawing represents a top view, and shows the coupling adjusted so as to cause the teeth to retain a vertical position, as is customary in harrows now in common use. By removing the two inner bolts *a* of the coupling in Fig. 2 the coupling would thus be so adjusted as to allow the teeth to assume the angle represented in Fig. 1.

Fig. 3 represents a section of the coupling, and is substantially the same as Fig. 2, except the former, Fig. 3, represents a side view, while the latter, Fig. 2, represents a top view, of the coupling. As represented in Fig. 3, the harrow-teeth will retain the vertical position, and in order to obtain the angle represented in Fig. 1 we have only to remove the two inner bolts *a a*. Should it be desirable to cause the teeth to retain any angle other than that which they will retain when the inner bolts alone are adjusted it can be accomplished by removing the inner bolts, and after pressing the outer part of the coupling below or raising it above the inner part of the coupling, replacing the second bolt through the outer part of the coupling, thus holding the inner part above or below the outer part of the coupling, and obtaining the desired angle.

What I claim as new and useful, and desire patented, is—

The coupling or connecting links, provided with a series of holes and bolts, as shown in Figs. 2 and 3, for flexible or rigid connection of the teeth-bars, in combination with the said bars, as shown and described.

CHARLES BRODRICK.

Witnesses:
ROBERT L. TATHAM,
EDWARD CRANE.